UNITED STATES PATENT OFFICE.

AMOS H. PERKINS, OF CHICAGO, ILLINOIS.

IMPROVEMENT IN CONCRETE PAVEMENTS.

Specification forming part of Letters Patent No. 124,620, dated March 12, 1872; antedated March 2, 1872.

SPECIFICATION.

I, AMOS H. PERKINS, of Chicago, in the county of Cook and State of Illinois, have invented a new Compound for Concrete Pavement, of which the following is a specification:

The nature of the present invention consists in melting, cooling, and crushing a certain stone found in Cook county, State of Illinois, and other places, and combining the stone so crushed with asphaltum, either to form blocks for pavement or coating-surface for walks, &c., as hereinafter fully described.

The aforesaid stone is composed of carbonate of lime, silica, potash, and a small quantity of asphaltum, there being a large amount of carbon. The stone is melted in any suitable furnace constructed to stand about the same heat as an iron-smelting furnace, after which the melted substance is drawn off and allowed to cool, so that it may be broken and crushed. The intense heat destroys what little asphaltum there is in the stone and consumes most of the carbon, the residual being principally a silicate of lime, which is quite hard enough for pavement, &c. The carbon in the crude stone takes fire during the melting process, creating an intense heat, thereby saving materially the amount of fuel required; and it, in escaping through the melted mass, causes the latter to become full of small pores, which are filled with the melted asphaltum when the blocks or pavements are made, so that the crushed substance is held together much more firmly than when asphaltum is combined with ordinary crushed or broken stone, inasmuch as the cementing qualities of the asphaltum is not wholly in this case relied on, as it is when combined with gravel, sand, limestone, &c.

In manufacturing blocks for pavement the small broken stone can be combined with the melted asphaltum in suitable molds, and formed under pressure when a very compact article is required, or they can be formed in molds by their own gravity. The process of pressing is, however, much the best, inasmuch as the crushed stone is brought closely together, requiring but little asphaltum.

I disclaim the patents granted to Fulton and Bruce for pavement, dated May 17, 1870; but claim as an improvement on said patent—

The manner of treating the stone—viz., melting it to destroy the bitumen and render the residuum porous, then cooling and crushing it and combining it with asphaltum, for the purpose set forth.

AMOS H. PERKINS.

Witnesses:
  G. L. CHAPIN,
  N. H. STEVENSON.